(12) United States Patent
Ahn et al.

(10) Patent No.: US 10,386,667 B2
(45) Date of Patent: Aug. 20, 2019

(54) LIQUID CRYSTAL DISPLAY WITH TOUCH SENSING FUNCTION

(71) Applicant: LG Display Co., Ltd., Seoul (KR)

(72) Inventors: Sung-Hoon Ahn, Gumi-si (KR); Chang-Kuk Yang, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 292 days.

(21) Appl. No.: 15/387,294

(22) Filed: Dec. 21, 2016

(65) Prior Publication Data

US 2017/0176798 A1 Jun. 22, 2017

(30) Foreign Application Priority Data

Dec. 22, 2015 (KR) .................. 10-2015-0183758

(51) Int. Cl.
| | |
|---|---|
| *G02F 1/1333* | (2006.01) |
| *G02F 1/1343* | (2006.01) |
| *G02F 1/1362* | (2006.01) |
| *G02F 1/1368* | (2006.01) |
| *G02F 1/1345* | (2006.01) |

(52) U.S. Cl.
CPC ........ *G02F 1/13338* (2013.01); *G02F 1/1345* (2013.01); *G02F 1/1368* (2013.01); *G02F 1/13439* (2013.01); *G02F 1/134309* (2013.01); *G02F 1/136286* (2013.01); *G02F 1/13458* (2013.01); *G02F 1/136227* (2013.01); *G02F 2001/13629* (2013.01); *G02F 2001/134318* (2013.01); *G02F 2001/136295* (2013.01); *G02F 2201/121* (2013.01); *G02F 2201/123* (2013.01)

(58) Field of Classification Search
None
See application file for complete search history.

(56) References Cited

U.S. PATENT DOCUMENTS

| | | | | |
|---|---|---|---|---|
| 8,330,927 | B2* | 12/2012 | Her | ......................... G09G 5/00 349/149 |
| 2002/0130983 | A1 | 9/2002 | Konishi et al. | |
| 2006/0139551 | A1* | 6/2006 | Kimura | ................. G02F 1/1345 349/149 |
| 2011/0018571 | A1* | 1/2011 | Kim | ...................... G02F 1/1345 324/760.02 |
| 2014/0168537 | A1* | 6/2014 | Han | ...................... G06F 3/0412 349/12 |

(Continued)

*Primary Examiner* — Edward J Glick
*Assistant Examiner* — David Y Chung
(74) *Attorney, Agent, or Firm* — Birch, Stewart, Kolasch & Birch, LLP

(57) ABSTRACT

A liquid crystal display device with a touch sensing function can improve productivity without a pitch limitation between pads in a pad area. The liquid crystal display device can include a touch signal line of a third wiring layer including lower and upper layers, and the lower layer is formed of the same material as a pixel electrode. A touch-common electrode of a fourth wiring layer is disposed on a second passivation layer, and is connected to a touch signal line via a second hole. A first data pad includes a first lower pad formed of a third wiring layer and connected to a first data link, a second lower pad formed of a first wiring layer, and an upper pad formed of the fourth wiring layer and connecting the first lower pad to the second lower pad, via a third contact hole and a fourth contact hole.

19 Claims, 15 Drawing Sheets

(56) References Cited

U.S. PATENT DOCUMENTS

2014/0240630 A1\* 8/2014 Jung .................. G02F 1/13452
349/43
2015/0103265 A1\* 4/2015 Kim ..................... G06F 3/0412
349/12

\* cited by examiner

LIQUID CRYSTAL DISPLAY WITH TOUCH SENSING FUNCTION

This application claims the priority benefit of Korean Patent Application No. 10-2015-0183758, filed in the Republic of Korea on Dec. 22, 2015, which is hereby incorporated by reference as if fully set forth herein.

BACKGROUND OF THE INVENTION

Field of the Invention

The present invention relates to a liquid crystal display device with touch sensing function capable of improving productivity without limitation of a pitch between pads in a pad part.

Discussion of the Related Art

A touch sensor capable of inputting information through touch on a screen of a display device is extensively applied to portable information equipment such as a smartphone as well as various display devices such as a laptop computer, a monitor, and household appliances.

A touch technology applied to the display devices is classified into an add-on type and an in-cell type according to a position of a touch sensor. The add-on type display device is an external system in which a touchscreen panel is formed on a display panel in an attached manner. The in-cell type display device is an internal system in which a touch electrode is embedded in a display panel such that the display panel and the touchscreen are integrated.

In the in-cell type display device, for slimness of the display device, an advanced in-cell touch (AIT) in which a common electrode of a liquid display device is divided for use as touch electrodes has been developed.

However, the in-cell touch display device further includes a touch signal line electrically connecting a common-touch electrode to a touch sensing unit, thereby increasing process steps and decreasing productivity. Since the number of pads in a pad part connected to a drive circuit is increased, a pitch or area between the pads is insufficient. Thereby, there is a disadvantage in decrease of reliability of the display device.

SUMMARY OF THE INVENTION

Therefore, the present invention has been made in view of the above problems, and it is an object of the present invention to provide a liquid display device with a touch sensing function capable of improving productivity without limitation of a pitch or spacing limitations between pads in a pad part.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device with a touch sensing function including a pixel electrode disposed on a first passivation layer and a planarization layer to cover a thin film transistor, the pixel electrode connected to a drain electrode via a first contact hole passing through the planarization layer and the first passivation layer, and a touch signal line including a third wiring layer including a lower layer and an upper layer, the lower layer being formed of the same material as the pixel electrode. A touch-common electrode is formed of the fourth wiring layer, disposed on a second passivation layer to cover the pixel electrode and the touch signal line, and connected to the touch signal line via a second hole passing through the second passivation layer.

A first data pad may be connected to a data line via a first data link, and a second data pad connected to the adjacent data line via a second data link may be disposed at a pad area provided by a first hole passing through the planarization layer and passivation layer.

The first data pad may include a first lower pad connected to the first data link, the first lower pad formed of a third wiring layer, a second lower pad formed of the first wiring layer, and an upper pad formed of the fourth wiring layer, the upper pad connecting the first lower pad to the second lower pad via a third contact hole passing through the passivation layer and a fourth contact hole passing through the passivation layer and the gate insulating layer.

The second data pad may include a lower pad formed of the first wiring layer, the lower pad being connected to the second data link, and an upper pad formed of the fourth wiring layer, the upper pad being connected to the lower pad via a fifth contact hole passing through the passivation layer and the gate insulating layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
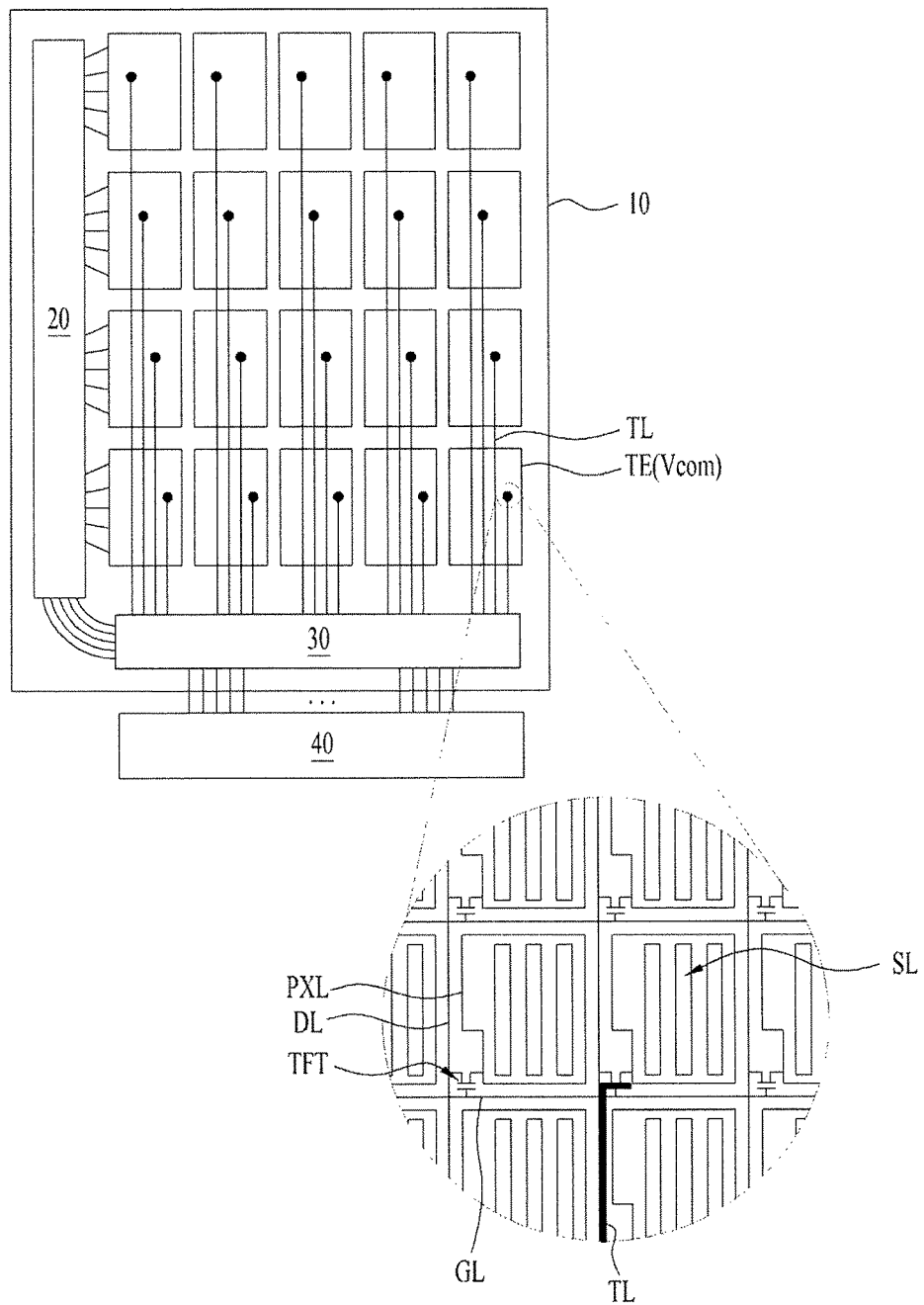
FIG. 1 is a view schematically illustrating a liquid display device with a touch sensing function according to an embodiment of the present invention.

FIG. 1 is a view schematically illustrating a liquid display device with a touch sensing function according to an embodiment of the present invention.

Referring to FIG. 1, the liquid display device with a touch sensing function includes a display panel 10, a gate driver 20, a data driver 30, and a touch sensing unit 40.

The display panel 10 displays an image through a pixel array in which pixels are arranged in a matrix. The display panel 10 senses capacitive touch using a common-touch electrode TE.

The display panel 10 includes a thin film transistor array substrate, a color filter array substrate, and a liquid crystal layer interposed between the thin film transistor array substrate and the color filter array substrate. In FIG. 1, the display panel 10 is shown mainly with the thin film transistor array substrate.

The thin film transistor array substrate of the display panel 10 includes thin film transistors TFTs connected to a gate line GL and a data line DL, pixel electrodes PXLs connected to the thin film transistors by every pixel, and common-touch electrodes (hereinafter referred to as a touch electrode) TEs by a pixel block unit including pixels. Each pixel drives liquid crystal molecules according to a voltage difference between a data signal supplied to one pixel electrode PXL through one thin film transistor TFT and a common voltage Vcom supplied to one touch electrode TE to adjust light transmittance. A plurality of slits SLs is provided at one of the pixel electrode PXL and the touch electrode TE overlapped, in which an insulating layer is interposed the pixel electrode PXL and the touch electrode TE. The pixel electrodes PXLs and the touch electrodes TE drive the liquid crystal layer in an in plane switching (IPS) mode or a fringe field switching (FFS) mode.

Each of the touch electrodes TEs has a structure in which a common electrode is divided to have a uniform size in consideration of a touch point size. The thin film transistor substrate includes a plurality of touch rows. Each touch row includes a plurality of touch electrodes TEs arranged in a longitudinal direction of the data line DL, and a plurality of touch signal lines TLs individually connected to the touch electrodes TEs while being connected to the touch sensing unit 40.

The data driver 30 converts an image data supplied from a timing controller into an analog signal during an operating period of the display device in order to supply the analog signal to the data lines DLs. The data driver 30 subdivides a gamma voltage set supplied from a gamma voltage generator, which is embedded in the data driver 30 or is separately provided, into grayscale voltages corresponding to grayscale values of data, respectively. The data driver 30 coverts digital data into positive or negative analog data voltages using the subdivided grayscale voltages during the operating period of the display device. Whenever the gate lines DLs are driven, the data driver 30 supplies data voltages to the data lines DLs, respectively. During the touch sensing period, the data driver 30 prevents the data voltages from being supplied to the data lines DLs.

The gate driver 20 sequentially drives the gate lines GLs during the operating period of the display device. In the operating period of the display device, a scan pulse of gate-on-voltage is supplied to one gate line GL every scan period. In the operating period of the other gate lines, a gate-off voltage is supplied. In the touch sensing period, the gate driver 20 does not supply the scan pulse to the gate lines GL.

During the operating period of the display device, a common voltage supply unit supplies the common voltage Vcom to the touch electrodes TEs through the touch signal lines TLs.

During the touch sensing period, the touch sensing unit 40 senses whether there is a touch or not through the touch electrodes TEs in a self-capacitance touch manner. The touch sensing unit 40 responds to a touch sync signal supplied from the timing controller to supply a touch drive signal to the touch electrodes TEs through the touch signal lines TLs during the touch sensing period. Then, the touch sensing unit 40 receives a feedback signal from the corresponding touch electrode TE. The touch sensing unit 40 differentially amplifies the touch drive signal and the feedback signal of the touch electrode TE to sense a change in self-capacitance (signal delay quantities) of the touch electrode TE due to a touch, thereby generating sensing information. The touch sensing unit 40 calculates touch coordinate information by signal processing of sensing information and outputs the touch coordinate information through a host system.

The touch sensing unit 40 may be integrated into a touch integrated chip (IC) or into the data driver 30 and a drive IC. The data driver 30 may include at least one IC. The gate driver 20 may include at least one IC or may be embedded into a non-display area of the thin film transistor substrate in a gate in panel (GIP) manner while the gate driver 20 and the thin film transistor array of the thin film transistor substrate are simultaneously formed.

Figure 2:
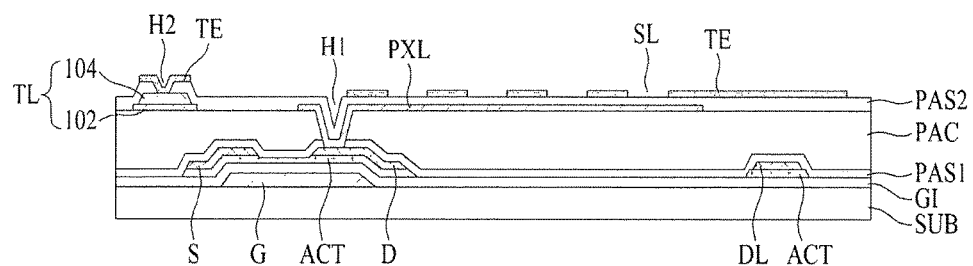
FIG. 2 is a view illustrating a pixel part in the liquid display device with a touch sensing function according to the illustrated embodiment of the present invention.

FIG. 2 is a view illustrating a pixel part in the liquid display device with touch sensing function according to the illustrated embodiment of the present invention.

Referring to FIG. 2, the thin film transistor TFT (see FIG. 1) includes a gate electrode G on a substrate SUB, a gate insulating layer GI covering the gate electrode G, an active layer ACT on the gate insulating layer GI, and a source electrode S and a drain electrode D on the active layer ACT.

A first wiring layer group including the gate electrode G connected to a gate line GL (see FIG. 1) is formed on the substrate SUB. The first wiring layer group may be formed to include a first wiring layer having a monolayer or multilayer structure formed of at least one metal of molybdenum (Mo), aluminum (Al), chromium (Cr), titanium (Ti), nickel (Ni), neodymium (Nd), and copper (Cu) or alloys thereof.

The gate insulating layer GI is formed on the substrate SUB to cover the first wiring layer group. The gate insulating layer GI may be formed to have a monolayer or multilayer structure formed of an inorganic insulating material such as silicon oxide (SiOx), silicon nitride (SiNx), or aluminum oxide (AlOx).

The active layer ACT is formed on the gate insulating layer GI. A second wiring layer group including the source electrode S, the drain electrode D and a data line DL connected to the source electrode S is formed on the active layer ACT.

The active layer ACT is formed to include an amorphous silicon layer and an amorphous silicon layer doped with an impurity (n+) functioning as an ohmic contact layer stacked on the gate insulating layer GI. The ohmic contact layer corresponding to a channel between the source electrode S and the drain electrode D is removed. Alternatively, an oxide semiconductor may be applied to the active layer ACT. The silicon oxide may include at least one of a zinc oxide (ZnO) semiconductor, an indium zinc oxide (IZO) semiconductor, an indium aluminum zinc oxide (IAZO) semiconductor, an indium gallium zinc oxide (IGZO) semiconductor, or an indium tin zinc oxide (ITZO) semiconductor.

The second wiring layer group including the source electrode S, the drain electrode D, and the data line DL on the active layer ACT may be formed to have a monolayer or multilayer structure formed of at least one metal of molybdenum (Mo), aluminum (Al), chromium (Cr), titanium (Ti), nickel (Ni), neodymium (Nd), and copper (Cu) or alloys thereof.

A first passivation layer PAS1 is formed on the gate insulating layer GI to cover the active layer ACT and the second wiring layer group on the active layer ACT which are stacked on the gate insulating layer GI. The first passivation layer PAS1 may be formed to have a monolayer or multilayer structure formed of an inorganic insulating material such as silicon oxide (SiOx), silicon nitride (SiNx), or aluminum oxide (AlOx).

A planarization layer PAC is formed on the first passivation layer PAS1. The planarization layer PAC is formed of an organic insulating material such as a photo acryl.

A third wiring layer group including a pixel electrode PXL and a touch signal line TL is formed on the planarization layer PAC. The pixel electrode PXL is connected to the drain electrode D through a first contact hole H1 passing through the planarization layer PAC and the first passivation layer PAS1. The pixel electrode PXL is formed of a transparent conductive layer including indium tin oxide (ITO) and indium zinc oxide (IZO). The touch signal line TL includes a transparent conductive layer 102 formed at the same level as the pixel electrode PLX while being formed of the same material as the pixel electrode PXL and a metallic layer 104 stacked on the transparent conductive layer 102. The metallic layer 104 may be formed to have a monolayer or multilayer structure formed of at least one metal of molybdenum (Mo), aluminum (Al), chromium (Cr), titanium (Ti), nickel (Ni), neodymium (Nd), and copper (Cu) or alloys thereof. Since the touch signal line TL is formed on the planarization layer PAC, which is relatively thick, signal interference between the touch signal line TL, the gate line GL, and the data line DL may be reduced.

A second passivation layer PAS2 is formed on the planarization layer PAC to cover the pixel electrode PXL and the third wiring layer group. The second passivation layer PAS2 may be formed to have a monolayer or multilayer structure formed of an inorganic insulating material such as silicon oxide (SiOx), silicon nitride (SiNx), or aluminum oxide (AlOx).

A fourth wiring layer group including the touch electrode TE is formed on the second passivation layer PAS2. The touch electrode TE overlaps with the pixel electrode PXL, with the second passivation layer PAS2 interposed therebetween. A plurality of slits SLs is provided to overlap with the pixel electrode PXL. The touch electrode TE is connected to the touch signal line TL through a second contact hole H2 passing through the second passivation layer PAS2. The fourth wiring layer group including the touch electrode TE is formed of a transparent conductive layer such as ITO and IZO.

FIGS. 3A to 3F are views illustrating processes of manufacturing the pixel part illustrated in FIG. 2 by mask processes.

Figure 3A:
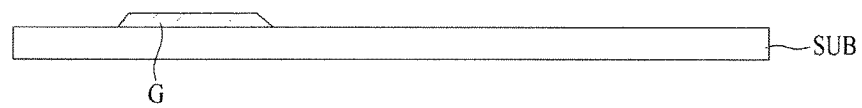
FIGS. 3A to 3F are views illustrating processes of manufacturing the pixel part illustrated in FIG. 2 by mask processes.

Referring to FIG. 3A, the first wiring layer group including the gate line GL and the gate electrode G is formed on the substrate SUB using a first mask process. A first wiring layer is deposited on the substrate SUB and is patterned by a photolithography process and an etching process using a first mask to form the first wiring layer group including the gate line GL and the gate electrode G on the substrate SUB.

Figure 3B:
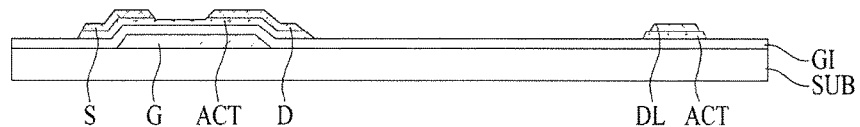

Referring to FIG. 3B, in a second mask process, the gate insulating layer GI, the active layer ACT and the second wiring layer group are formed on the substrate SUB on which the first wiring layer group is formed, to have a stacked structure. The second wiring layer group includes the source electrode S, the drain electrode D, and the data line DL. The gate insulating layer GI is deposited on the substrate SUB to cover the first wiring layer group. After a semiconductor layer and a second wiring layer are stacked on the gate insulating layer GI, the semiconductor layer and the second wiring layer are patterned by a photolithography process and an etching process using a second mask to form the second wiring layer group including the source electrode S, the drain electrode D, and the data line DL.

A half-tone mask or a diffraction (slit) mask is used for the second mask. Photoresist patterns having first and second heights are formed on the second wiring layer by a photolithography process using the second mask. A first photoresist region having the first height while corresponding to a half-tone part (or diffraction part) of the second mask is formed at a part at which a channel part of the active layer ACT will be formed. A second photoresist region having the second height (e.g., a height greater than the first height) while corresponding to the light shielding part of the second mask is formed at a part at which the second wiring layer group and the active layer ACT below the second wiring layer group will be formed. The photoresist is not formed at a part from which the semiconductor layer and the second wiring layer are removed to correspond to an exposure part of the second mask. The second wiring layer and the semiconductor layer are patterned by an etching process using the photoresist pattern as a mask to form the active layer ACT and the second wiring layer group on the active layer ACT. Herein, the source electrode S is connected to the drain electrode D. The first photoresist region, and the second wiring layer and the ohmic contact layer below the first photoresist region are removed by a sequential etching process to be divided into the source electrode S and the drain electrode D and to form the channel part without the ohmic contact layer in the active layer ACT below the source electrode S and the drain electrode D.

Figure 3C:
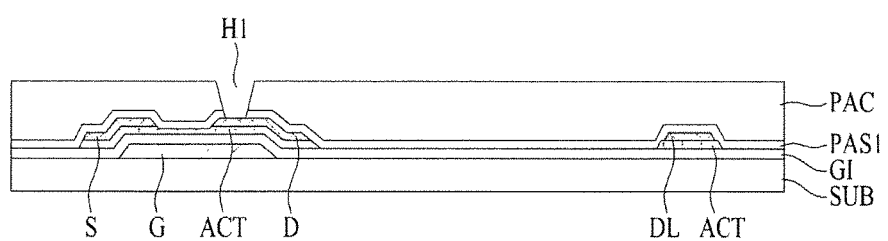

Referring to FIG. 3C, the first passivation layer PAS1 and the planarization layer PAC are formed on the gate insulating layer GI at which the active layer ACT and the second wiring layer group are formed, to have a stacked structure. The first passivation layer PAS1 is formed on the gate insulating layer GI by deposition to cover the active layer ACT and the second wiring layer group. The planarization layer PAC is formed on the first passivation layer PAS1. The contact hole H1 passing through the planarization layer PAC and the first passivation layer PAS1 to expose a part of the drain electrode D is formed by a photolithography process and an etching process using a third mask.

Figure 3D:
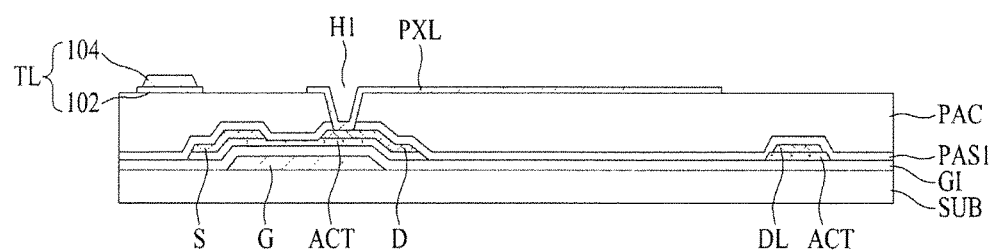

Referring to FIG. 3D, in a fourth mask process, the third wiring layer group including the pixel electrode PXL and the touch signal line TL including the transparent conductive layer 102 and the metallic layer 104, which are stacked, is formed on the planarization layer PAC. The transparent conductive layer 102 and the metallic layer 104 are sequentially deposited on the planarization layer PAC to form a third wiring layer. The third wiring layer is patterned by a photolithography process and an etching process using a fourth mask to form the third wiring layer group including the pixel electrode PXL and the touch signal line TL.

A half-tone mask or a diffraction (slit) mask is used for the fourth mask. Photoresist patterns having first and second heights are formed on an upper metallic layer by a photolithography process using the fourth mask. A first photoresist region having the first height while corresponding to a half-tone part (or a diffraction part) of the fourth mask is formed at a part at which the pixel electrode will be formed. A second photoresist region having the second height (e.g., greater than the first height) while corresponding to a light shielding part of the fourth mask is formed at a part at which the touch signal line TL will be formed. The photoresist is not formed at a part from which the third wiring layer is removed to correspond to an exposure part of the fourth mask. The upper metallic layer is patterned by an etching process using the photoresist pattern as a mask. After the first photoresist region at which the pixel electrode PXL is formed is removed by an ashing process, a lower transparent conductive layer is patterned by an etching process using the patterned upper metallic layer as a mask. Then, after the upper metallic layer exposed on the pixel electrode PXL is removed by an etching process, the second photoresist region remaining on the touch signal line TL is removed by a stripping process. As a result, since the pixel electrode PXL of the transparent conductive layer, and the touch signal line TL including the transparent conductive layer 102 and the metallic layer 104 stacked are formed, there is no separate mask process for the touch signal ling TL, thereby improving productivity. The pixel electrode PXL is connected to the drain electrode D through the first contact hole H1.

Meanwhile, a space between the pixel electrode PXL and the touch signal line TL corresponds to the exposure part of the fourth mask. There is a limit to reducing a distance of the space below 6 μm because of the exposure. Thereby, a distance between the pixel electrode PXL and the touch signal line TL is increased, which decreases a size of the pixel electrode PXL. However, according to the present invention, a 0.5 to 1.5 μm thick light shielding line (or a dark line) is provided at an edge of the half-tone part (or the diffraction part) corresponding to a part at which the pixel electrode PXL will be formed to reduce the exposure amount. Thereby, the distance between the pixel electrode PXL and the touch signal line TL may be reduced to 6 μm or less to prevent the size of the pixel electrode PXL from being reduced.

Figure 3E:
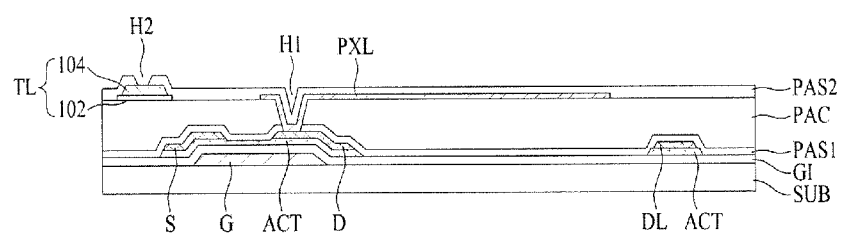

Referring to FIG. 3E, in a fifth mask process, the second passivation layer PAS 2 is formed on the planarization layer PAC at which the third wiring layer group is formed. The second passivation layer PAS2 is formed on the planarization layer PAC by deposition to cover the third wiring layer group. The contact hole H2 passing through the second passivation PAS2 while exposing a part of the metallic layer 104 which is the upper layer of the touch signal line TL is formed by a photolithography process and an etching process using a fifth mask.

Figure 3F:
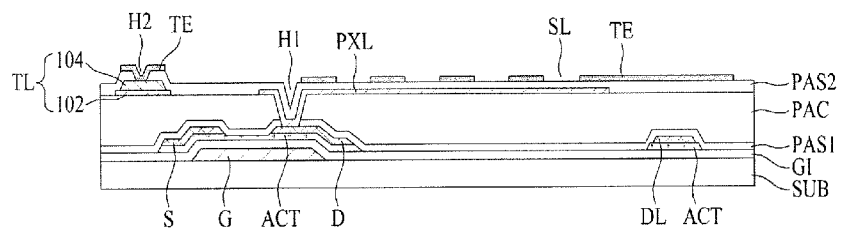

Referring to FIG. 3F, in a sixth mask process, the touch electrode TE is formed on the second passivation layer PAS2. A transparent conductive layer is formed on the second passivation layer PAS2 by deposition. The transparent conductive layer is patterned by the sixth mask process to form the touch electrode TE (e.g., as discussed above, the touch electrodes together form the common voltage Vcom of the display during display operation) on the second passivation layer PAS2. The touch electrode TE is connected to the touch signal line TL through the contact hole H2.

According to the illustrated embodiment of the present invention, in the liquid crystal display device with a touch detection function, the touch signal line TL including the transparent conductive layer 102 and the metallic layer 104 stacked and the third wiring layer group including the pixel electrode PXL formed of a transparent conductive layer are formed at the same level using the same mask process. Thus, a separate mask for forming the touch signal line TL is not needed, thereby improving productivity in comparison with using a separate mask for forming the touch signal line TL.

Figure 4:
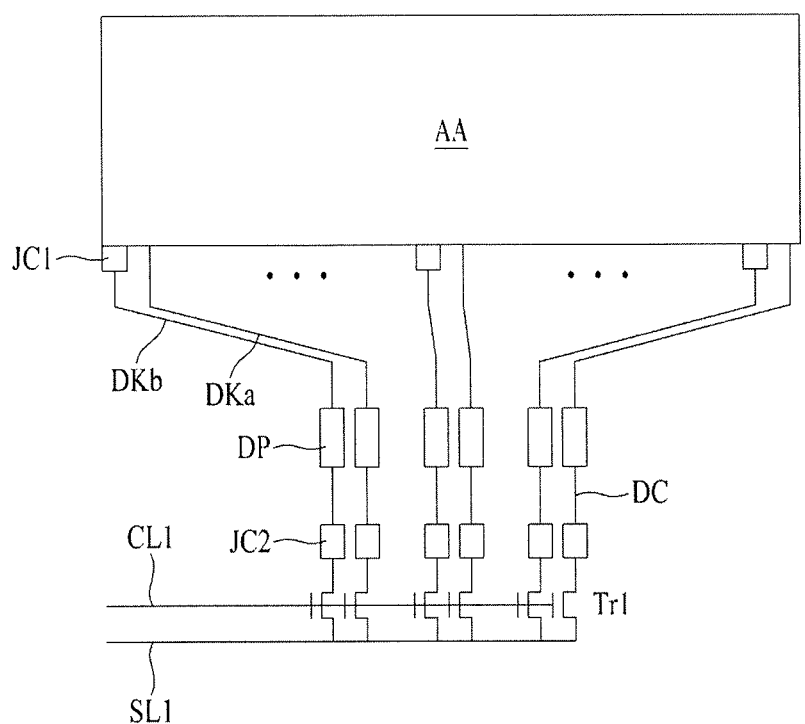
FIG. 4 is a view schematically illustrating data wirings in a non-display area of the liquid display device with a touch detection function according to the illustrated embodiment of the present invention.

FIG. 4 is a view schematically illustrating data wirings in a non-display area of the liquid display device with a touch sensing function according to the illustrated embodiment of the present invention.

Referring to FIG. 4, the data lines DLs (see FIG. 1) of a display area AA are individually connected to the data pads DPs formed at the pad area via data links DKa and DKb formed at the non-display area. The data pads DPs are parts to be connected to drive ICs mounted thereon. Additionally, the data pads DPs are individually connected to check transistors Tr1s via connection lines DC.

The data links DKa and DKb include a first data link DKa formed of the second wiring layer (the data wiring), which is the same as the data line DL (see FIG. 1) while being connected to the data line DL, and a second data link DKb formed of the first wiring layer different from the data line DL while being connected to an adjacent data line (e.g., another data line next to the data line DL) via a first jumping connector JC1. The first data link DKa of the second wiring layer and the second data link DKb of the first wiring layer are alternately arranged in the non-display area and are made from different wiring layers. Accordingly, a pitch or the area between between the data links DKa and DKb in the limited non-display area including a plurality of data links DKa and DKb is sufficiently secured, thereby improving reliability (e.g., since the alternating data links are formed from different wiring layers with different masks, they can be placed closer together).

The first data link DKa of the second wiring layer in the pad area is connected to the connection line DC of the first wiring layer via the data pad DP. The second data link DKb of the first wiring layer is connected to the connection line DC the first wiring layer via the data pad DP. The connection lines DCs of the first wiring layer are individually connected to the drain electrodes of the check transistors Tr1s formed of the second wiring layer via second jumping connectors JC2s.

The drain electrodes of the check transistors Tr1s are individually connected to the data lines DLs via the second jumping connectors JC2s, the connection lines DCs, the data pads DPs, or the data links DKa and DKb. The gate electrodes are commonly connected to a control line CL1. The source electrodes are commonly connected to a signal line SL1. The check transistors Tr1s are used for checking failure such as short circuit and opening of the data lines DLs.

Figure 5:
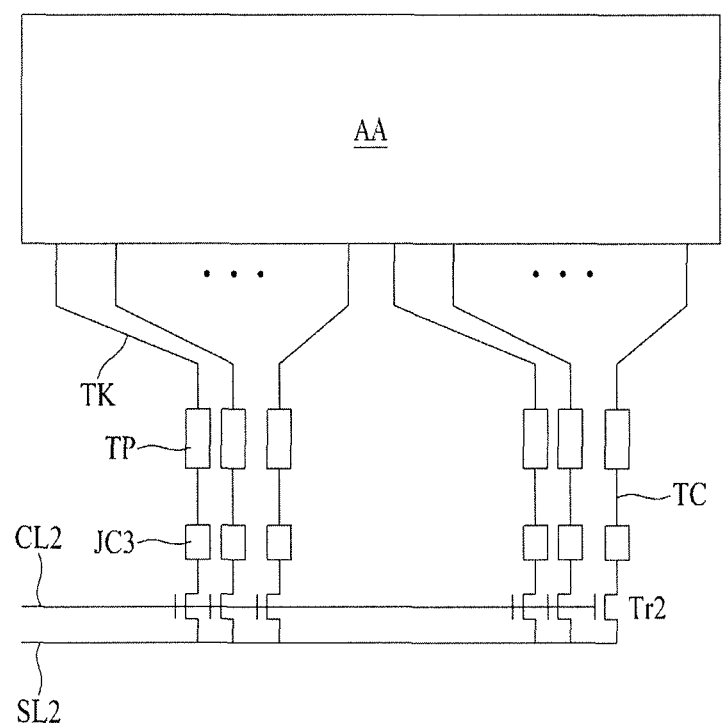
FIG. 5 is a view schematically illustrating touch wirings in the non-display area of the liquid display device with a touch sensing function according to the illustrated embodiment of the present invention.

FIG. 5 is a view schematically illustrating touch wirings in the non-display area of the liquid display device with a touch sensing function according to the illustrated embodiment of the present invention.

Referring to FIG. 5, the touch signal lines TLs (see FIG. 1) of the display area are individually connected to the touch pads TDs formed at the pad part via the touch links TKs formed at the non-display area. Each touch pad TP is a part for connecting to the drive IC mounted thereon. Additionally, the touch pads TPs are individually connected to the check transistors Tr2 via the connection lines TCs. The touch pads TPs in the pad area may be separately disposed at both sides of the data pads DPs illustrated in FIG. 4.

The touch links TKs are formed of the third wiring layer, which is the same as the touch signal line TL (see FIG. 1), to be connected to the touch signal line TL. The touch links are connected to the touching connection lines TCs of the first wiring layer via the touch pads TPs. The connection lines TCs of the first wiring layer are individually connected to drain electrodes of the check transistors Tr2s, which are formed of the second wiring layer, via third jumping connectors JC3s.

The drain electrodes of the check transistors Tr2s are individually connected to the touch signal lines TLs via the third jumping connectors JC3s, the connection lines TCs, the touch pads TPs, the touch links TKs. The gate electrodes are commonly connected to a control line CL2. The source lines are commonly connected to a signal line SL2. The check transistors Tr2 are used for checking failure such as short circuit and opening of the touch signal lines TLs and the touch electrodes TEs.

Figure 6:
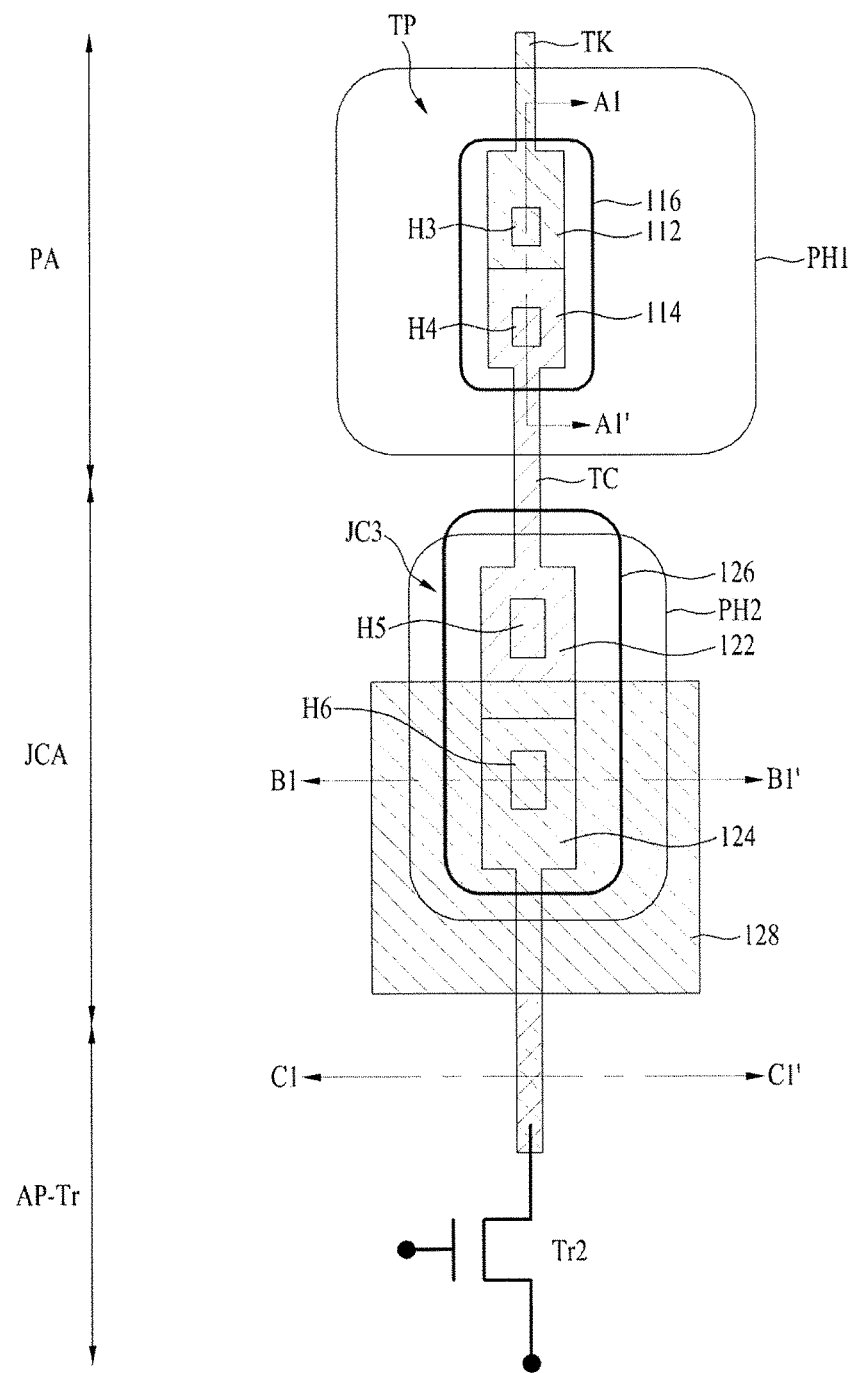
FIG. 6 is an enlarged plan view illustrating the touch wirings in the non-display area of the liquid display device with a touch sensing function according to the illustrated embodiment of the present invention.
Figure 7A:
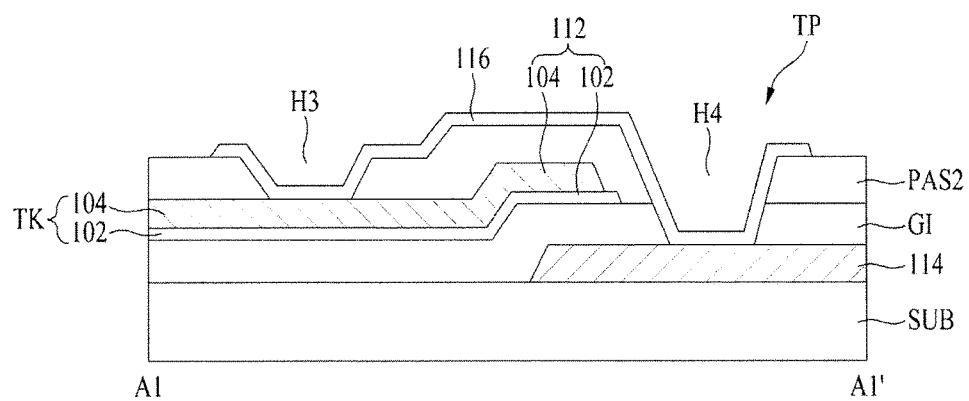
FIGS. 7A to 7C are cross-sectional views illustrating the touch wirings illustrated in FIG. 6 by regions.
Figure 7B:
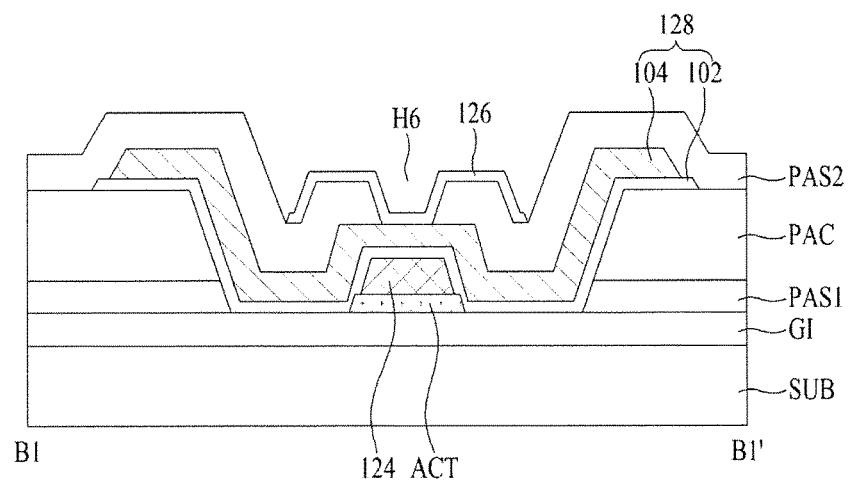
Figure 7C:
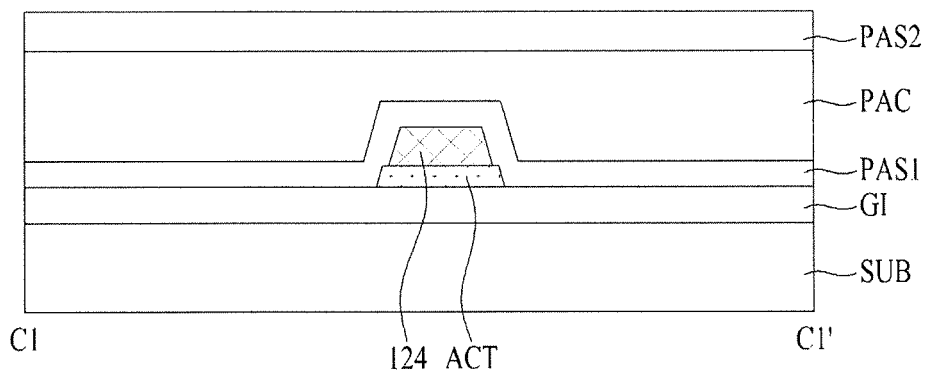

FIG. 6 is an enlarged plan view illustrating the touch wirings in the non-display area of the liquid display device with touch sensing function according to the illustrated embodiment of the present invention. FIG. 7A is a cross-sectional view illustrating the touch pad in the pad area PA taken along line A1-A1'. FIG. 7B is a cross-sectional view illustrating the jumping connectors in a jumping area JCA taken along line B1-B1'. FIG. 7C is a cross-sectional view illustrating the check transistor area AP-Tr taken along line C1-C1'.

Referring to FIGS. 6 and 7A, the touch pad TP includes a first lower pad 112, a second lower pad 114, and an upper pad 116 which are formed at different layers. The upper pad 116 is a part connecting the first lower pad 112 to the second lower pad 114 while being connected to the drive IC.

The first lower pad 112 of the touch pad TP is formed of the third wiring layer 102 and 104 which is the same as the touch signal line TL (see FIGS. 1 and 2) and the touch link TK to be connected to the touch link TK.

A hole PH1, formed by removing the planarization layer PAC and the first passivation layer PAS 1, is provided at the pad area PA to reinforce adhesive force of the drive IC. In the hole PH1 of the pad area PA, the touch link TK and the first lower pad 112 of the third wiring layer 102 and 104 are disposed on the gate insulating layer GI.

The second lower pad 114 of the touch pad TP is formed between the substrate SUB and the gate insulating layer GI while being formed of the first wiring layer. The first wiring layer and the gate electrode (namely, the first wiring layer group) are simultaneously formed.

The upper pad 116 of the touch pad TP is formed of the fourth wiring layer on the second passivation layer PAS2. The upper pad 116 is connected to the first and second lower pads 112 and 114 via a contact hole H3 passing through the second passivation layer PAS2 to expose a part of the first lower pad 112 and a contact hole H4 passing through the second passivation layer PAS2 and the gate insulating layer GI to expose a part of the second lower pad 114. The fourth wiring layer is a transparent conductive layer which is the same as the touch electrode TE while being formed of at least one of ITO, IZO and ITZO having high corrosion resistance and acid resistance.

Referring to FIGS. 6, 7B and 7C, the third jumping connector JC3 in the jumping area JCA includes a first lower electrode 122 connected to the second lower pad 114 of the touch pad TP via the connection line TL, a second lower electrode 124 formed at a different layer from the first lower electrode 122, a middle electrode 128, and an upper electrode 126.

The first lower electrode 122 of the third jumping connector JC3 is formed of the same first wiring layer as the second lower pad 114 of the touch pad TP and the connection line TC, to be connected to the connection line TC.

The second lower electrode 124 of the third jumping connector JC3 is formed of the second wiring layer. The second lower electrode 124 extends to the check transistor area AP-Tr to be connected to the drain electrode (the second wiring layer) of the check transistor Tr2. The active layer ACT is formed below the second lower electrode 124.

The jumping area JCA includes a hole PH2 passing through the planarization layer PAC and the first passivation layer PAS1. The middle electrode 128 of the third jumping connector JC3 is formed of the third wiring layer covering the second lower electrode 124 of the second wiring layer exposed by the hole PH2 while including the transparent conductive layer 102 and the metallic layer 104 which are stacked. Thereby, the middle electrode 128 functions to prevent the second lower electrode 124 of the second wiring layer from being etched in a process of forming the third wiring layer group. The middle electrode 128 is formed to have a greater width than the second hole PH2, such that the middle electrode 128 is formed on the planarization layer PAC via an inclined surface of the planarization layer PAC and the first passivation layer PAS1, which surround the hole PH2.

The upper electrode 126 is formed on the passivation layer PAS 2 while being formed of the fourth wiring layer. The fourth layer includes a transparent conductive layer which is the same as the touch electrode TE while being formed of at least one of ITO, IZO and ITZO having high corrosion resistance and acid resistance. The upper electrode 126 connects the first lower electrode 122 to the middle electrode 128 via a contact hole H5 passing through the second passivation layer PAS2 and the gate insulating layer GI to expose a part of the first lower electrode 122 and a contact hole H6 passing through the second passivation layer PAS2 to expose a part of the middle electrode 128. Accordingly, the third jumping connector JC3 connects the connection line TC formed of the first wiring layer to the drain electrode of the check transistor Tr2 formed of the second wiring layer.

Figure 8:
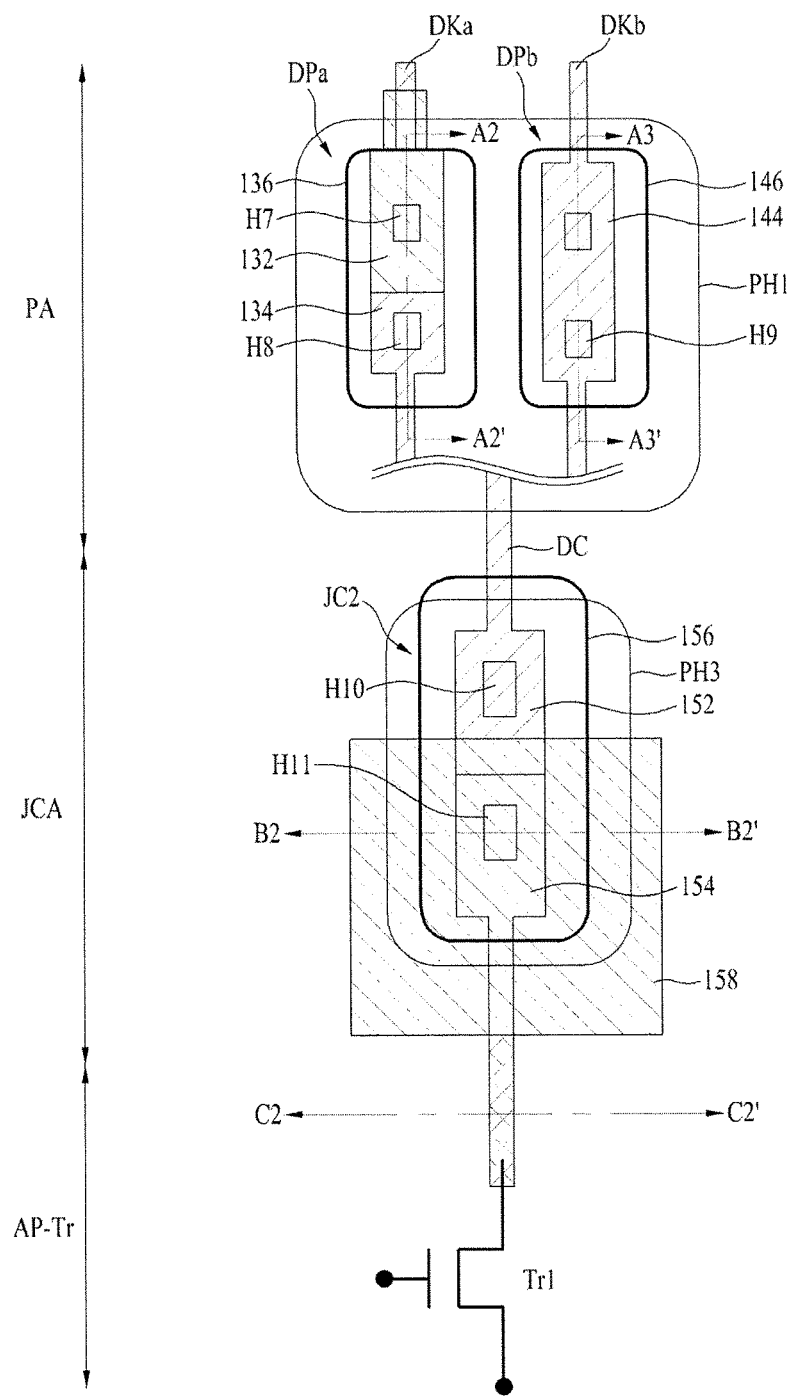
FIG. 8 is an enlarged plan view illustrating data wirings in the non-display area of the liquid display device with a touch sensing function according to the illustrated embodiment of the present invention.
Figure 9A:
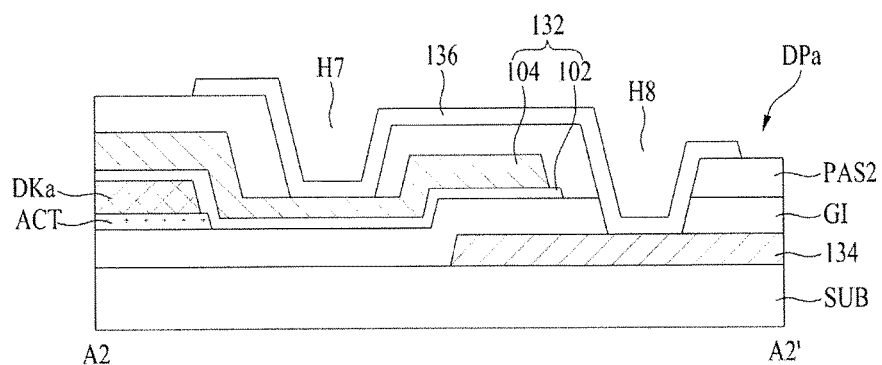
FIGS. 9A to 9D are cross-sectional views illustrating the data wirings in the non-display area illustrated in FIG. 8 by regions.
Figure 9B:
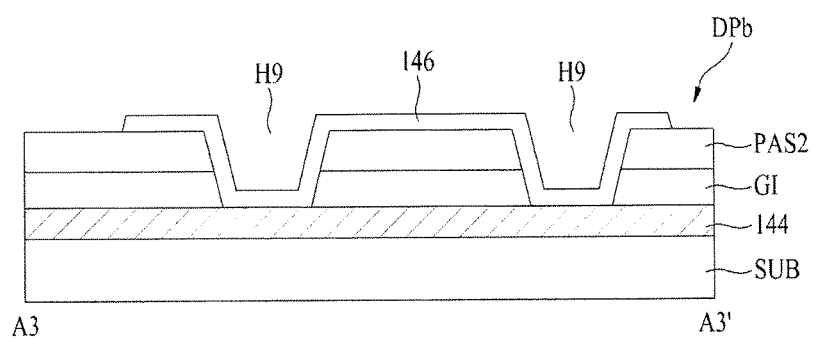
Figure 9C:
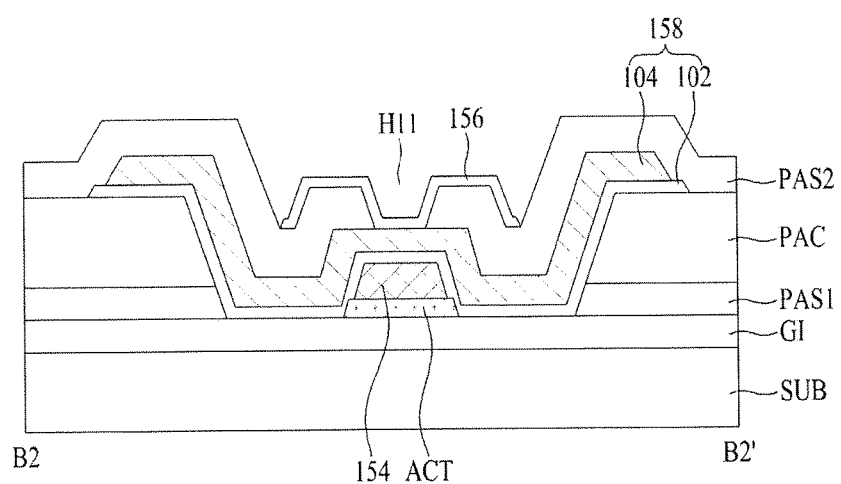
Figure 9D:
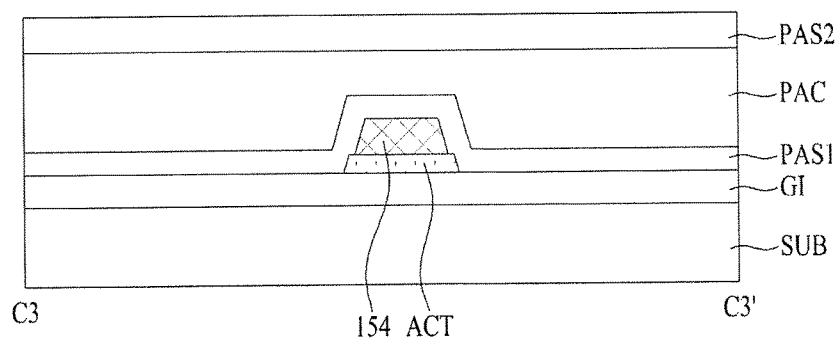

FIG. 8 is an enlarged plan view illustrating data wirings in the non-display area of the liquid display device with a touch sensing function according to the illustrated embodiment of the present invention. FIG. 9A is a cross-sectional view illustrating a first data pad in the pad area PA taken along line A2-A2'. FIG. 9B is a cross-sectional view illustrating a second data pad in the pad area PA taken along line A3-A3'. FIG. 9C is a cross-sectional view illustrating a jumping connector in the jumping area JCA taken along line B2-B2'. FIG. 9D is a cross-sectional view illustrating the check transistor area AP-Tr taken along line C2-C2'.

Referring to FIGS. 8, 9A to 9D, the pad area PA includes first and second data pads DPa and DPb which have different sectional structures. The first and second data pads DPa and DPb are alternately arranged in the pad area PA.

The first data pad DPa includes a first lower pad 132, a second lower pad 134, and an upper pad 136 which are disposed at different layers. The upper pad 136 is a part connecting the first lower pad 132 to the second lower pad 134 while being connected to the drive IC.

The first lower pad 132 of the first data pad DPa is formed of the third wiring layer 102 and 104. The first lower pad 132 is connected to the first data link DKa formed of the second wiring layer to cover an end of the first data link DKa. The pad area PA includes a hole PH1, which is formed by removing the planarization layer PAC and the first passivation layer PAS 1, which reinforces adhesive force of the driver IC. In the hole PH1 of the pad area PA, the first lower pad 132 of the third wiring layer 102 and 104 is disposed on the end of the first data link DKa and the gate insulating layer GI. In a process of forming the third wiring layer group, the first lower pad 132 functions to prevent the exposed end of the first data link DKa of the second wiring layer from being etched. The end of the first data link DKa is disposed below a part of the first lower pad 132 having relatively narrow width, and is not formed below a part of the first lower pad 132 having relatively wide width.

The second lower pad 134 of the first data pad DPa is formed between the substrate SUB and the gate insulating layer GI while being formed of the first wiring layer. The first wiring layer and a gate wiring (namely, the first wiring layer group) are simultaneously formed.

The upper pad 136 of the first data pad DPa is formed on the second passivation layer PAS2 while being formed of the fourth wiring layer. The upper pad 136 connects the first lower pad 132 to the second lower pad 134 via a contact hole H7 passing through the second passivation layer PAS2 to expose a part of the first lower pad 132 and a contact hole H8 passing through the second passivation layer PAS2 and the gate insulating layer GI to expose a part of the second lower pad 134. The fourth wiring layer being a transparent conductive layer which is the same as the touch electrode TE is formed of at least one of ITO, IZO and ITZO having high corrosion resistance and acid resistance.

The second data pad DPb includes a lower pad 144 formed of the first wiring layer on the substrate SUB and an upper pad 146 formed of the fourth wiring layer on the second passivation layer PAS2. The upper pad 146 is a part connected to the drive IC and is connected to the lower pad 144 via one or more contact holes H9 passing through the second passivation layer PAS2 and the gate insulating layer GI.

Referring to FIGS. 8, 9C and 9D, the second jumping connector JC2 in the jumping area JCA includes a first lower electrode 152, a second lower electrode 154 formed at a different layer than the first lower electrode 152, a middle electrode 158, and an upper electrode 156.

The first lower electrode 152 of the second jumping connector JC2 is formed of the first wiring layer which is the same as the second lower pad 134 of the first data pad DPa, the lower pad 144 of the second data pad DPb, and the connection line DC. Thereby, the first lower electrode 152 is connected to the second lower pad 134 of the first data pad DPa or the lower pad 144 of the second data pad DPb via the connection line DC.

The second lower electrode 154 of the second jumping connector JC2 is formed of the second wiring layer which is the same as the drain electrode of the check transistor Tr1. Thereby, the second lower electrode 154 is connected to the drain electrode of the check transistor Tr1. The active layer ACT is formed below the second lower electrode 154.

The jumping area JCA includes a hole PH3 passing through the planarization layer PAC and the first passivation layer PAS1. The middle electrode 158 of the second jumping connector JC2 is formed of the third wiring layer including the transparent conductive layer 102 and the metallic layer 104 which are stacked, to cover the second lower electrode 154 of the second wiring layer exposed by the hole PH3. Thereby, in a process of forming the third wiring layer group, the middle electrode 158 functions to prevent the second lower electrode 154 of the second wiring layer from being etched. The middle electrode 158 is formed to have a greater width than the second hole PH2, such that the middle electrode 128 is formed on the planarization layer PAC via an inclined surface of the planarization layer PAC and the first passivation layer PAS1 which surround the hole PH2.

The upper electrode 156 of the second jumping connector JC2 is formed of the fourth wiring layer on the second passivation layer PAS2. The fourth wiring layer includes a transparent conductive layer which is the same as the touch electrode TE and is formed of at least one of ITO, IZO and ITZO having high corrosion resistance and acid resistance. The upper electrode 156 connects the first lower electrode 152 to the middle electrode 158 via a contact hole H10 passing through the second passivation layer PAS2 and the gate insulating layer GI to expose a part of the first lower electrode 152 and a contact hole H11 passing through the second passivation layer PAS2 to expose a part of the middle electrode 158. Accordingly, the second jumping connector JC2 connects the connection line DC formed of the first wiring layer to the drain electrode of the check transistor Tr1 formed of the second wiring layer.

Meanwhile, the first jumping connector JC1 connecting the data line DL (see FIG. 2) formed of the second wiring layer in the display area AA to the second link DKb formed of the first wiring layer in the non-display area has the same structure as the second jumping connector JC2 as illustrated in FIGS. 8 and 9C. Namely, the first jumping connector JC1 includes the first lower electrode 152 formed of the first wiring layer to be connected to the second data link DKb, the second lower electrode 154 formed of second wiring layer to be connected to the data line DL, the middle electrode 158 covering the second lower electrode 154 exposed by the hole PH3 passing through the planarization layer PAC and the first passivation layer PAS1 with the third wiring layer, and the upper electrode 156 formed of the fourth wiring layer while connecting the first lower electrode 152 to the middle electrode 158 via contact holes H10 and H11.

Meanwhile, the hole PH1 passing through the planarization layer PAC and the first passivation layer PAS1 to provide the pad area, and the pad area PA, at which the touch pads TPs and data pads DPs connected to the drive IC are formed, are formed in an integrated manner. Thereby, the inclined surface of the planarization layer PAC and the first passivation layer PAS1 in the hole PH1 surrounds the touch pads TPs and the data pads DPs. The holes PH2 and PH3 passing through the planarization layer PAC and the first passivation layer PAS1 are individually formed at the jumping connectors JC1, JC2, and JC3. Thus, the inclined surface of the planarization layer PAC and the first passivation layer PAS1 in the holes PH2 and PH3 surrounds each of the jumping connectors JC1, JC2, and JC3.

Figure 10:
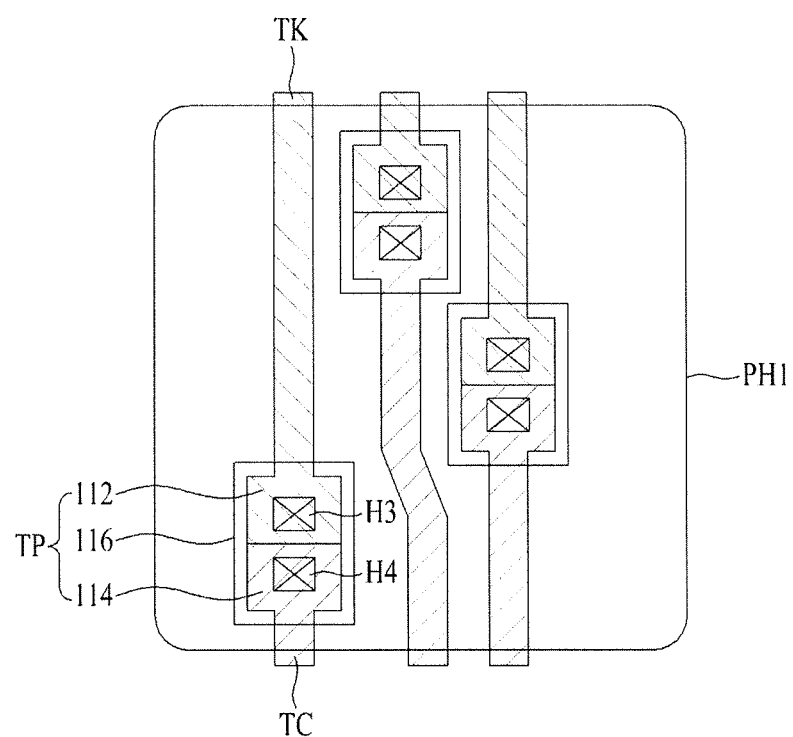
FIG. 10 is a plan view illustrating touch pads in a pad part of the liquid display device with touch sensing function according to the illustrated embodiment of the present invention.
Figure 11:
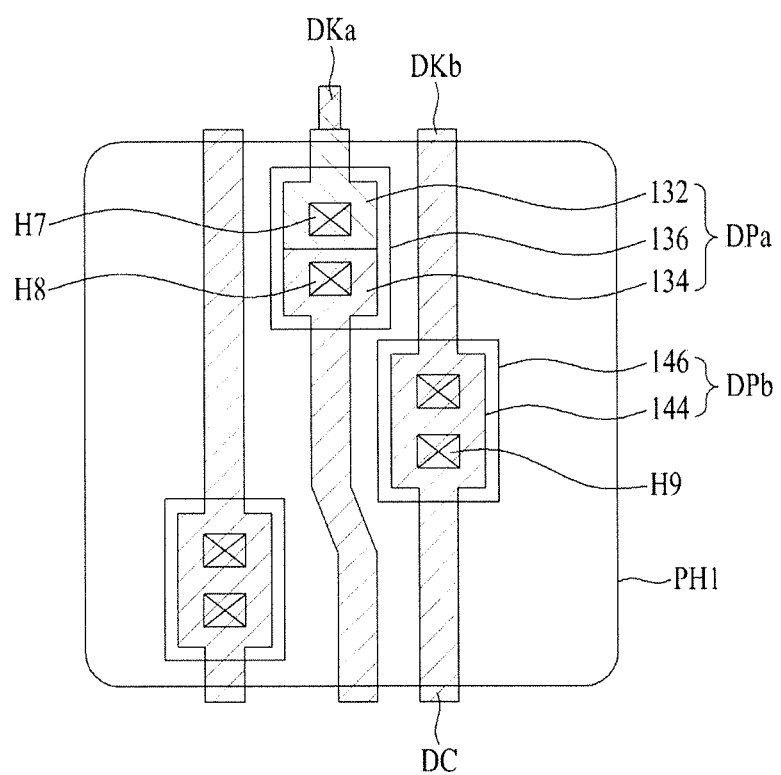
FIG. 11 is a plan view illustrating data pads in the pad part of the liquid display device with a touch sensing function according to the illustrated embodiment of the present invention.

FIG. 10 is a plan view illustrating touch pads in a pad part of the liquid display device with a touch sensing function according to the illustrated embodiment of the present invention. FIG. 11 is a plan view illustrating data pads in the pad part of the liquid display device with a touch sensing function according to the illustrated embodiment of the present invention.

Referring to FIG. 10, the touch pads TPs disposed at the pad area provided by the first hole PH1 while being connected to the drive IC include the first and second lower pads 112 and 114 having a relatively large area and the upper pad 116. The touch pads TPs are disposed at different positions in a vertical direction, such that the touch pads TP are not adjacent to one another in a horizontal direction. Accordingly, the pitch or sufficient area between the touch pads TPs in the limited pad area may be secured, thereby improving reliability.

Referring to FIG. 11, the first data pad DPa disposed at the pad area provided by the hole PH1 while being connected to the drive IC includes the first and second lower pads 132 and 134 having relatively large area and the upper pad 136. The second data pad includes the lower pad 144 having a relatively large area and the upper pad 146. The first and second data pads DPa and DPb are disposed at different positions in a vertical direction, such that the data pads are not adjacent to one another in a horizontal direction. Accordingly, the pitch or space between the data pads DPa and DPb TPs in the limited pad area may be secured, thereby improving reliability.

Particularly, the data link DKa of the second wiring is connected to an extending part of the first lower pad 132 formed of the third wiring layer such that there is no second wiring layer which needs the third wiring layer for prevention of etching, in the pad area.

When the second wiring layer is disposed at the pad area, a width of each of the data pads DPa and DPb is increased by the second wiring layer and the third wiring layer for covering the second wiring layer to prevent the second wiring layer from being etched. Accordingly, the pitch between the data pads DPa and DPb is insufficient, thereby generating short circuit.

However, in the present invention, there is no second wiring layer in the pad area, such that the width of each of the data pads DPa and DPb is not increased. Accordingly, the pitch between the touch pads DPa and DPb is secured, thereby improving reliability in comparison with the second wiring layer in the pad area as described above.

Figure 12:
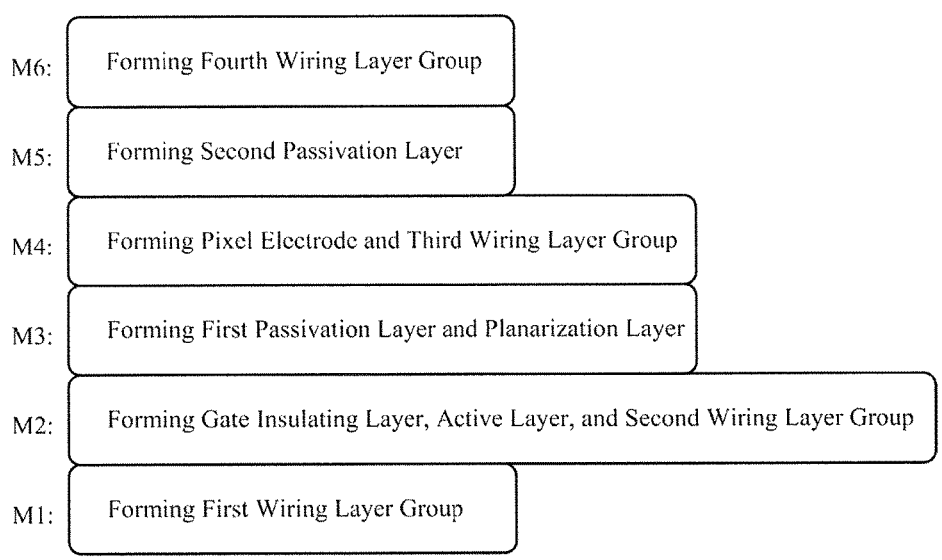
FIG. 12 is a flowchart illustrating a process of manufacturing a thin film transistor array substrate in the liquid display device with touch sensing function according to the illustrated embodiment of the present invention.

FIG. 12 is a view illustrating a process of manufacturing the thin film transistor array substrate in the liquid display device with touch detection function according to the illustrated embodiment of the present invention. In addition, FIG. 12 is applied to the above-described embodiments.

The first wiring layer group formed of the first wiring layer is formed on the substrate SUB in the first mask process M1. The first wiring layer group includes a gate wiring including the gate line GL, the gate electrode G, the second lower pad 114 of the touch pad TP, the touch connection line TC, the second data link DKb, the second lower pad 134 of the first data pad DPa, the lower pad 144 of the second data pad DPb, and the data connection line DC.

In the second mask process M2, the gate insulating layer GI, the active layer ACT, and the second wiring layer group are formed on the substrate SUB at which the first wiring layer group is formed. The second wiring layer group includes the data wiring including the source electrode S, the drain electrode D, the data line DL, and the first data link DKa, and the second lower electrodes 124 and 154 of the jumping connectors JC2 and JC3. The active layer ACT and the second wiring layer group are formed using a half-tone mask or a diffraction mask while being formed in the same second mask process M2. Thereby, the active layer ACT is disposed below the second wiring layer group.

In the third mask process M3, the first passivation layer PAS1 and the planarization layer PAC are formed to be stacked on the gate insulating layer GI at which the active layer ACT and the second wiring layer group are formed. The contact hole H1 passing through the planarization layer PAC and the first passivation layer PAS1 to expose a part of the drain electrode D, the hole PH1 providing the pad area, and the holes PH2 and PH3 individually formed at the jumping connectors JC1, JC2, and JC3 are provided. The gate insulating layer GI and the end of the first data link DKa of the second wiring layer are exposed by the hole PH1 in the pad area. The gate insulating layer GI and the second wiring layer are exposed by the holes PH2 and PH3 in the jumping connectors JC1, JC2, and JC3.

In the fourth mask process M4, the pixel electrode PXL including a transparent conductive layer, and the third wiring layer group formed on the third wiring layer while including the transparent conductive layer and the metallic layer which are stacked are formed on the planarization layer PAC. The third wiring layer group formed of the third wiring layer while including the transparent conductive layer and the metallic layer which are stacked includes the touch signal line TL, the touch link TK, the first lower pad 112 of the touch pad TP, the first lower pad of the first data pad DPa, and the middle electrodes 128 and 158 in the jumping connector JC2 and JC3 for preventing the second wiring layer from being etched. The pixel electrode PXL including the transparent conductive layer, and the third wiring layer group formed of the third wiring layer while including the transparent conductive layer and the metallic layer which are stacked, are simultaneously formed by the same process using a half-tone mask or a diffraction mask, as described above.

In the fifth mask process M5, the second passivation layer PAS2 is formed on the planarization layer PAC at which the pixel electrode PXL and the third wiring layer group are formed. The contact hole H2 passing through the second passivation layer PAS2 to expose a part of the touch signal line TL is formed. Furthermore, in the pad area, the contact holes H3 and H4 of the touch pads TPs, the contact holes H7, H8, and H9 of the data pads DPa and DPb, and the contact holes H5, H6, H10, and H11 of the jumping connector JC1, JC2, and JC3 are formed to pass through the second passivation layer PAS2 or the second passivation layer PAS2 and the gate insulating layer GI.

In the sixth mask process M6, the fourth wiring layer group formed of the fourth wiring layer being the transparent conductive layer is formed on the second passivation layer PAS2. The fourth wiring layer group includes the touch electrode TE, the upper pad of the touch pad TP, the upper pads 136 and 146 of the data pads DPa and DPb, and the upper electrodes 126 and 156 of the jumping connectors JC1, JC2, and JC3.

According to the illustrated embodiment of the present invention, in the liquid crystal display device with touch sensing function, the touch signal line TL of the third wiring layer including the transparent conductive layer 102 and the metallic layer 104 which are stacked, and the pixel electrode PXL including the transparent conductive layer are formed at the same level using the same mask process. Thus, a separate mask process for forming the touch signal line TL is not needed, thereby improving productivity in comparison with forming the touch signal line TL with a separate mask process.

In addition, according to the illustrated embodiment of the present invention, in the liquid crystal display device with a touch sensing function, in the pad area, the first lower pad 132 of the third wiring layer, the second lower pad 134 of the first wiring layer, the first data pad DPa having the same structure as the upper pad 136 of the fourth wiring layer, and the second data pad DPb having the same structure as the lower pad 144 of the first wiring layer and the upper pad 146 of the fourth wiring layer are alternately arranged. The second wiring layer requiring protection of the third wiring layer is not needed such that the pitch between the data pads DPa and DPb is sufficiently secured, thereby improving reliability.

As is apparent from the above description, according to the present invention, in the liquid crystal display device with a touch sensing function according to the illustrated embodiment, the touch signal line of the third wiring layer including a transparent conductive layer and a metallic layer which are stacked, and the pixel electrode including a transparent conductive layer are formed at the same level using the same mask process, such that a separate mask process for forming the touch signal line is not needed, thereby improving productivity.

In the liquid crystal display device with a touch sensing function according to the illustrated embodiment of the present invention, the first lower pad of the third wiring layer, the second low pad of the first wiring layer, the first data pad having a structure which is the same as the upper pad of the fourth wiring layer, and the second data pad having a structure which is the same as the upper pad of the fourth wiring layer are alternately arranged in the pad area, such that the second wiring layer requiring protection of the third wiring layer is not needed in the pad area. Thus, the pitch between the data pads is sufficiently secured, thereby improving reliability.

The above description is merely given to describe the present invention by way of example, and numerous modifications and embodiments can be devised by those skilled in the art that will fall within the spirit and scope of the principles of this disclosure. Accordingly, the embodiments disclosed in the specification of the present invention are not intended to limit the present invention. The scope of the present invention should be construed by the following claims, and all technologies and the invention is to cover all modifications, equivalents, and alternatives falling within the spirit and scope of the invention as defined by the claims.

What is claimed is:

1. A liquid crystal display device with a touch sensing function comprising:
   a thin film transistor comprising a gate electrode of a first wiring layer, a gate insulating layer, and an active layer which are stacked, and a source electrode and a drain electrode of a second wiring layer on the active layer;
   a first passivation layer covering the thin film transistor;
   a planarization layer formed on the first passivation layer;
   a pixel electrode disposed on the planarization layer;
   a touch signal line formed of a third wiring layer including a lower layer and an upper layer, the lower layer being formed of the same material as the pixel electrode;
   a touch-common electrode disposed on a second passivation layer and formed of a fourth wiring layer, the touch-common electrode connected to the touch signal line and overlapping the pixel electrode and the touch signal line;
   a first data line connected to the thin film transistor; and
   a first data pad connected to the first data line via a first data link, wherein the first data pad is disposed at a pad area provided in a first hole passing through the planarization layer and the first passivation layer,
   wherein the first data pad comprises:
      a first lower pad formed of the third wiring layer and not overlapping the second wiring layer in the pad area;
      a second lower pad formed of the first wiring layer;
      an upper pad formed of the fourth wiring layer and connecting the first lower pad to the second lower pad via contact holes passing through the second passivation layer and the gate insulating layer, and
   wherein the first data pad connects to the first data link via an extension portion extended from the first lower pad.

2. The liquid crystal display device with a touch sensing function according to claim 1, further comprising:
   a second data link formed of the first wiring layer and connected to a second data line adjacent the first data line via a first jumping connector; and
   a second data pad disposed at the pad area and connected to the second data link,
   wherein the second data pad comprises:
      a lower pad formed of the first wiring layer and connected to the second data link; and
      an upper pad formed of the fourth wiring layer and connected to the lower pad via a contact hole passing through the second passivation layer and the gate insulating layer.

3. The liquid crystal display device with a touch sensing function according to claim 2, further comprising:
   a touch pad connected to the touch signal line via a touch link,
   wherein the touch pad comprises:
      a first lower pad formed of the third wiring layer;
      a second lower pad formed of the first wiring layer; and
      an upper pad formed of the fourth wiring layer and connecting the first lower pad of the touch pad to the second lower pad of the touch pad via contact holes passing through the second passivation layer and the gate insulating layer.

4. The liquid crystal display device with a touch sensing function according to claim 3, further comprising:
   first check transistors individually connected to the first data pad and the second data pad via second jumping connectors, respectively; and
   a second check transistor connected to the touch pad via a third jumping connector,
   wherein each of the second and the third jumping connectors comprises:
      a first lower electrode connected to the first lower pad of the first data pad, the lower pad of the second data pad, or the second lower pad of the touch pad via a connection line formed of the first wiring layer;
      a second lower electrode formed of the second wiring layer and connected to one of the first or second check transistors;
      a second hole passing through the planarization layer and the first passivation layer to expose the first and second lower electrodes;
      a middle electrode formed of the third wiring layer and connected to the second lower electrode via the second hole to cover the second lower electrode of the second wiring layer; and
      an upper electrode formed of the fourth wiring layer and connecting the first lower electrode to the middle electrode via contact holes passing through the second passivation layer and the gate insulating layer.

5. The liquid crystal display device with a touch sensing function according to claim 4, wherein the first jumping connector connecting the adjacent data line to the second data link comprises:
a first lower electrode formed of the first wiring layer and connected to the second data link;
a second lower electrode formed of the second wiring layer and connected to the adjacent data line;
a third hole passing through the planarization layer and the first passivation layer to expose the first and second lower electrodes of the first jumping connector;
a middle electrode formed of the third wiring layer and connected to the second lower electrode of the first jumping connector formed of the second wiring layer, via the third hole to cover the second lower electrode; and
an upper electrode formed of the fourth wiring layer and connecting the first lower electrode to the middle electrode of the first jumping connector via contact holes passing through the second passivation layer and the gate insulating layer.

6. The liquid crystal display device with a touch sensing function according to claim 2, wherein:
the first data link and the first data line are formed of the second wiring layer.

7. The liquid crystal display device with a touch sensing function according to claim 2, further comprising a plurality of the first data links and a plurality of the second data links,
wherein the plurality of first data links and the plurality of second data links are alternately arranged in a non-display region, and
wherein the second data links are formed of a different wiring layer than the first wiring layer of the first data links.

8. The liquid crystal display device with a touch sensing function according to claim 2, wherein the first and second data pads are not adjacent to each other.

9. The liquid crystal display device with a touch sensing function according to claim 1, wherein the second wiring layer is disposed between the first wiring layer and the third wiring layer, and
wherein the third wiring layer is disposed between the second wiring layer and the fourth wiring layer.

10. A liquid crystal display device with a touch sensing function comprising:
a display panel including a plurality of data lines and a plurality gate lines respectively connected to a plurality of thin film transistors, and a plurality of pixels, the plurality of gate lines being formed of a first wiring layer and the plurality of data lines being formed of a second wiring layer, wherein each of the plurality of pixels includes a pixel electrode formed of a third wiring layer;
a touch-common electrode formed of a fourth wiring layer and overlapping the pixel electrode;
a touch signal line formed of the third wiring layer and connected to the touch-common electrode, wherein the touch signal line and the pixel electrode are formed of a same material;
a first data pad connected to a first data line and a second data pad connected to a second data line adjacent the first data line, wherein the first and second data pads comprise at least one of the first wiring layer, the third wiring layer or the fourth wiring layer; and
a touch pad connected to the touch signal line,
wherein the touch pad includes a first lower pad formed of the third wiring layer, a second lower pad formed of the first wiring layer, and an upper pad formed of the fourth wiring layer,
wherein the upper pad of the touch pad connects the first lower pad of the touch pad to the second lower pad of the touch pad,
wherein the first data pad comprises:
a first lower pad formed of the third wiring layer and not overlapping the second wiring layer in a pad area;
a second lower pad formed of the first wiring layer; and
an upper pad formed of the fourth wiring layer and connecting the first lower pad to the second lower pad, and
wherein the first data pad connects to the first data line via an extension portion extended from the first lower pad.

11. The liquid crystal display device with a touch sensing function according to claim 10, wherein the third wiring layer is disposed between the first wiring layer and the fourth wiring layer.

12. The liquid crystal display device with a touch sensing function according to claim 10, wherein the first lower pad of the first data pad is connected to the data line via a first data link formed of a second wiring layer.

13. The liquid crystal display device with a touch sensing function according to claim 10, wherein the upper pad of the first data pad has a width wider than a width of the first lower pad of the first data pad, and
wherein the width of the first lower pad of the first data pad is wider than a width of the first data link.

14. The liquid crystal display device with a touch sensing function according to claim 10, wherein the second data pad includes a lower pad formed of the first wiring layer and an upper pad formed of the fourth wiring layer,
wherein the upper pad of the second data pad connects two portions of the lower pad to each other, and
wherein the lower pad of the second data pad is connected to the second data line via a second data link formed of a first wiring layer.

15. The liquid crystal display device with a touch sensing function according to claim 10, further comprising:
a plurality of check transistors respectively connected to the touch pad and the first and second data pads, via corresponding jumping connectors.

16. The liquid crystal display device with a touch sensing function according to claim 15, wherein each of the corresponding jumping connectors includes one end formed of the first wiring layer and another end formed of the second wiring layer, and an upper electrode formed of the fourth wiring layer and connecting the one end to the another end.

17. The liquid crystal display device with a touch sensing function according to claim 16, wherein each of the corresponding jumping connectors includes a middle electrode formed of the third wiring layer that connects the another end formed of the second wiring layer to the upper electrode formed of the fourth wiring layer.

18. A liquid crystal display device with a touch sensing function comprising:
a display panel including a plurality of data lines and a plurality gate lines respectively connected to a plurality of thin film transistors, and a plurality of pixels, the plurality of gate lines being formed of a first wiring layer and the plurality of data lines being formed of a second wiring layer;
a touch-common electrode formed of a fourth wiring layer;

a touch signal line formed of a third wiring layer and connected to the touch-common electrode;

a first data pad connected to a data line among the plurality of data lines and including a first lower data pad formed of the third wiring layer and connected to the data line via a first data link, a second lower data pad formed of the first wiring layer, and an upper data pad formed of the fourth wiring layer connecting the first lower data pad to the second lower data pad;

a touch pad connected to the touch signal line and including a first lower touch pad formed of the third wiring layer, a second lower touch pad formed of the first wiring layer, and an upper touch pad formed of the fourth wiring layer connecting the first lower touch pad to the second lower touch pad; and a plurality of check transistors respectively connected to the touch pad and the first data pad, via corresponding jumping connectors, wherein each of the corresponding jumping connectors includes one end formed of the first wiring layer and another end formed of the second wiring layer, and an upper electrode formed of the fourth wiring layer and connecting the one end to the another end, wherein the first lower pad of the third wiring layer does not overlap the second wiring layer in a pad area, and wherein the first data pad connects to the first data link via an extension portion extended from the first lower pad.

19. The liquid crystal display device with a touch sensing function according to claim 18, wherein the second wiring layer is disposed between the first wiring layer and the third wiring layer, and wherein the third wiring layer is disposed between the second wiring layer and the fourth wiring layer.

* * * * *